United States Patent
Bredno et al.

(10) Patent No.: US 10,430,981 B2
(45) Date of Patent: Oct. 1, 2019

(54) IMAGE ARTIFACT IDENTIFICATION AND MITIGATION

(75) Inventors: Joerg Bredno, San Francisco, CA (US); Eberhard Sebastian Hansis, Menlo Park, CA (US); David Sowards-Emmerd, San Jose, CA (US)

(73) Assignee: KONINKLIKE PHILIPS N.V., Eindhoven (NL)

( * ) Notice: Subject to any disclaimer, the term of this patent is extended or adjusted under 35 U.S.C. 154(b) by 336 days.

(21) Appl. No.: 13/881,155

(22) PCT Filed: Oct. 20, 2011

(86) PCT No.: PCT/IB2011/054685
§ 371 (c)(1),
(2), (4) Date: Apr. 24, 2013

(87) PCT Pub. No.: WO2012/056379
PCT Pub. Date: May 3, 2012

(65) Prior Publication Data
US 2013/0222430 A1    Aug. 29, 2013

Related U.S. Application Data

(60) Provisional application No. 61/407,167, filed on Oct. 27, 2010.

(51) Int. Cl.
*G06T 11/00* (2006.01)
*G06T 7/00* (2017.01)

(52) U.S. Cl.
CPC .......... *G06T 11/003* (2013.01); *G06T 7/0014* (2013.01); *G06T 2200/24* (2013.01);
(Continued)

(58) Field of Classification Search
CPC combination set(s) only.
See application file for complete search history.

(56) References Cited

U.S. PATENT DOCUMENTS 4,580,219 A  *  4/1986   Pelc et al. ..................... 382/131
5,371,778 A  *  12/1994  Yanof et al. ..................... 378/4
(Continued)

OTHER PUBLICATIONS

Faloutsos et al., Efficient and Effective Querying by Image Content, Journal of Intelligent Information Systems, 1994, pp. 231-262 (date unknown).*
(Continued)

*Primary Examiner* — Motilewa Good Johnson

(57) ABSTRACT

A method includes displaying at least one of projection data or reconstructed image data having visually observable artifacts, wherein the at least one of the projection data or the reconstructed image data corresponds to an imaging examination of an object or subject and displaying, concurrently with the at least one of the projection data or the reconstructed image data, sample images with known artifacts. The method further includes identifying one or more of the sample images having artifacts similar to the visually observable artifacts in the at least one of the projection data or the reconstructed image data. The method further includes displaying information about the identified one or more of the sample images, wherein the information includes information related to mitigating the visually observable artifacts.

24 Claims, 2 Drawing Sheets

(52) U.S. Cl.
CPC .............. *G06T 2207/10072* (2013.01); *G06T 2207/30004* (2013.01)

(56) References Cited

U.S. PATENT DOCUMENTS

| | | | |
|---|---|---|---|
| 5,803,914 A * | 9/1998 | Ryals et al. ........ | A61B 1/00009 600/200 |
| 6,353,653 B1 * | 3/2002 | Edic .................................. | 378/8 |
| 6,691,134 B1 | 2/2004 | Babula et al. | |
| 6,931,094 B2 * | 8/2005 | Li .................................... | 378/62 |
| 7,374,077 B2 | 5/2008 | Shimura | |
| 7,646,842 B2 * | 1/2010 | Hsieh et al. ..................... | 378/4 |
| 7,653,224 B2 * | 1/2010 | Goto et al. ..................... | 382/128 |
| 7,720,931 B2 | 5/2010 | Mei et al. | |
| 8,045,776 B2 | 10/2011 | Hopkins et al. | |
| 8,244,058 B1 * | 8/2012 | Intwala et al. ................ | 382/275 |
| 2003/0093004 A1 * | 5/2003 | Sosa et al. .................... | 600/544 |
| 2003/0095697 A1 * | 5/2003 | Wood .................... | A61B 6/032 382/131 |
| 2003/0212327 A1 * | 11/2003 | Wang .................... | A61B 6/463 600/437 |
| 2004/0264628 A1 * | 12/2004 | Besson ............................ | 378/5 |
| 2006/0106642 A1 * | 5/2006 | Reicher ................. | G06F 19/321 705/2 |
| 2006/0115054 A1 * | 6/2006 | Yatsenko et al. ............. | 378/207 |
| 2007/0127809 A1 * | 6/2007 | Leach .................. | G06T 7/0024 382/154 |
| 2007/0236491 A1 * | 10/2007 | Hundley et al. ............... | 345/418 |
| 2008/0019581 A1 * | 1/2008 | Gkanatsios ............ | A61B 6/025 382/131 |
| 2008/0019607 A1 * | 1/2008 | Star-Lack et al. ............ | 382/264 |
| 2009/0318815 A1 * | 12/2009 | Barnes ................. | A61B 5/0062 600/473 |
| 2012/0197103 A1 * | 8/2012 | Sorensen ....................... | 600/410 |
| 2014/0010432 A1 * | 1/2014 | Cohen-Solal ......... | G06F 19/321 382/131 |

OTHER PUBLICATIONS

Moscariello et al., Coronary CT angiography: image quality, diagnostic accuracy, and potential for radiation dose reduction using a novel iterative image reconstruction technique-comparision with traditional filtered back projection, pp. 2130-2138, European Society of Radiology, 2011 (Year: 2011).*

Barrett, J. F., et al.; Artifacts in CT: Recognition and Avoidance; 2004; Radiographics; vol. 24; pp. 1679-1691.

Bellon, E. M., et al.; MR Artifacts: A Review; 1986; American Journal of Roentgenology; 147(6)1271-1281.

Malik, M. M., et al.; Comparative Visualization for Parameter Studies of Dataset Series; 2010; IEEE Trans. on Visualization and Computer Graphics; 16(5)829-839.

Popilock, R., et al.; CT Artifact Recognition for the Nuclear Technologist; 2008; Journal of Nuclear Medicine Technology; 36(2)79-81.

* cited by examiner

IMAGE ARTIFACT IDENTIFICATION AND MITIGATION

CROSS REFERENCE TO RELATED APPLICATIONS

This application is a national filing of PCT application Serial No. PCT/IB2011/054685, filed Oct. 20, 2011, published as WO 2012/056379 A1 on May 3, 2012, which claims the benefit of U.S. provisional application Ser. No. 61/407,167 filed Oct. 27, 2010, which is incorporated herein by reference.

The following generally relates to identifying and mitigating image artifacts and is described with particular application to computed tomography (CT); however, the following is also amenable to Positron-Emission Tomography (PET), Single-Photon-Emission Tomography (SPECT), Magnetic Resonance Imaging (MRI), and/or other imaging modalities.

A computed tomography (CT) scanner includes an x-ray tube that emits radiation that traverses an examination region and a portion of an object or subject therein. A detector detects radiation traversing the examination region and generates projection data indicative of the detected radiation. A reconstructor reconstructs the projection data and generates volumetric image data indicative of the portion of the object or subject in the examination region.

The volumetric image data may include visual artifacts caused by a non-favorable scan setup, non-accurate calibration data, patient motion, implants, a system defect, and/or other reasons. Examples of such artifacts include streaks, rings, blur, etc. Such artifacts may make it difficult if not impossible for a clinical user to see certain tissue of interest.

Some artifacts can be removed or reduced simply by processing the image data or processing the projection data and reconstructing the processed projected data. Other artifacts are mitigated through pre-scan setup, calibration, patient preparation, etc. and/or scan time acts (e.g., having the patient hold their breath, etc.).

Often, detailed technical knowledge is required to identify and determine the reason for an artifact visible in volumetric image data. Unfortunately, when the reason for an artifact is not known and cannot be identified, clinical users cannot determine proper corrective action to salvage the existing scan data and the object or subject may have to be re-scanned and/or to avoid the occurrence of such artifacts in a subsequent imaging examination.

Aspects of the present application address the above-referenced matters and others.

According to one aspect, a method includes displaying at least one of projection data or reconstructed image data having visually observable artifacts, wherein at least one of the projection data or the reconstructed image data corresponds to an imaging examination of an object or subject and displaying, concurrently with at least one of the projection data or the reconstructed image data, sample images with known artifacts. The method further includes identifying one or more of the sample images having artifacts similar to the visually observable artifacts in at least one of the projection data or the reconstructed image data. The method further includes displaying information about the identified one or more of the sample images, wherein the information includes information related to mitigating the visually observable artifacts.

According to another aspect, a computing system includes computer readable storage medium and one or more processors. The computer readable storage medium includes application memory encoded with instructions for at least an image artifact identification application. The computer readable storage medium also includes data memory encoded with data utilized by the image artifact identification application. The one or more processors execute the instructions for the image artifact identification application, and the executing instructions display an interactive graphical viewer displaying sample images with known artifacts concurrently with at least one of projection or image data from an imaging examination.

According to another aspect, a computing readable storage medium encoded with computer readable instructions, which, when executed by one or more processors of a computing system, cause the computer system to display an interactive graphical viewer displaying sample images with known artifacts concurrently with at least one of projection or image data from an imaging examination, wherein each sample image includes information related to mitigating a corresponding artifact.

The invention may take form in various components and arrangements of components, and in various steps and arrangements of steps. The drawings are only for purposes of illustrating the preferred embodiments and are not to be construed as limiting the invention.

Figure 1:
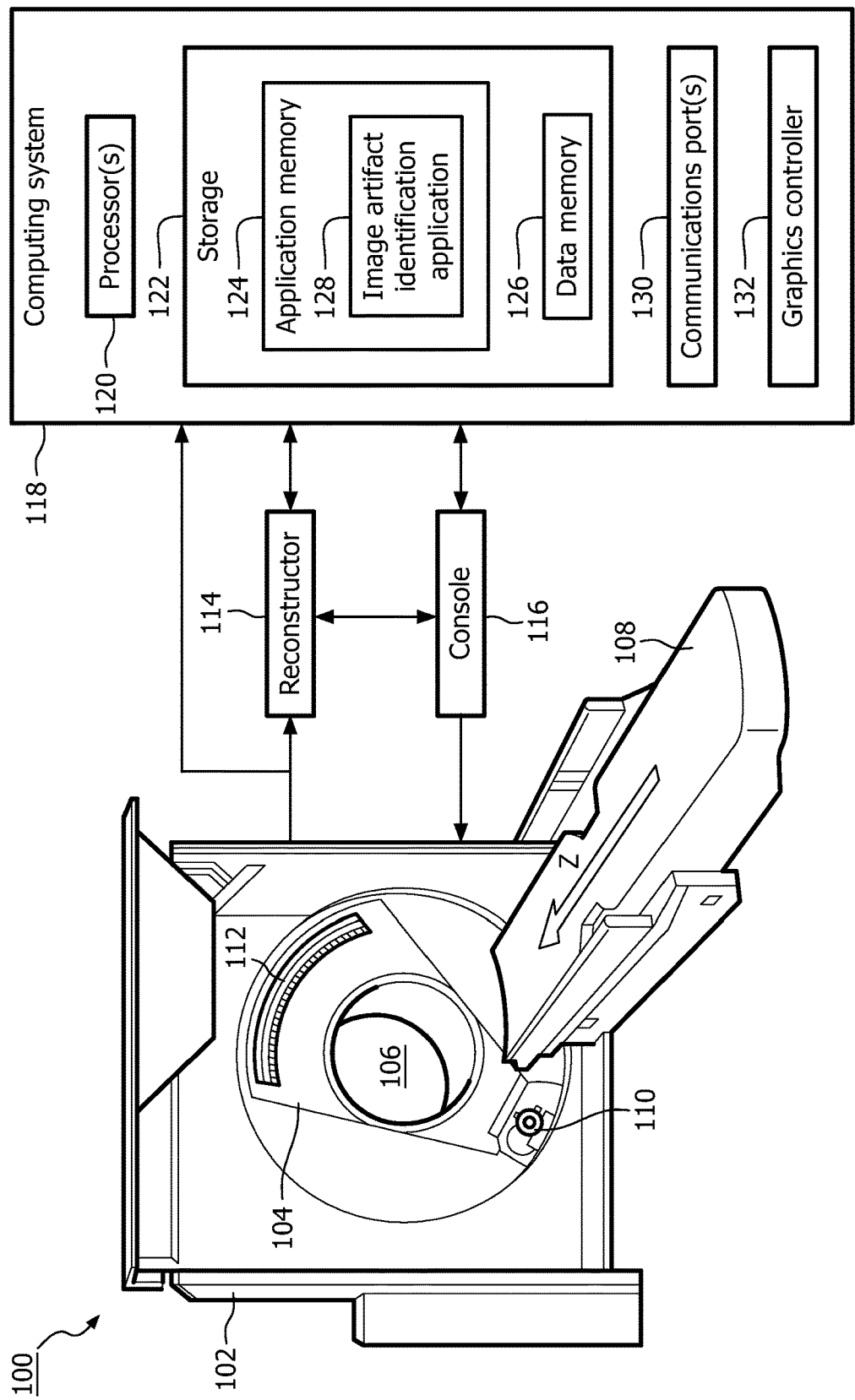
FIG. 1 illustrates an imaging system in connection with an image artifact identification application.

FIG. 1 illustrates an imaging system such as a computed tomography (CT) scanner 100. The scanner 100 includes a stationary gantry 102 and a rotating gantry 104, which is rotatably supported by the stationary gantry 102. The rotating gantry 104 rotates around an examination region 106 about a longitudinal or z-axis. A patient support 108, such as a couch, supports a patient in the examination region 106 and is movable along the z-axis in coordination with the rotation of the rotating gantry 104 to facilitate helical, axial, or other desired scanning trajectories.

A radiation source 110, such as an x-ray tube, is supported by and rotates with the rotating gantry 104 around the examination region 106. The radiation source 110 emits radiation that is collimated by a source collimator to produce a generally fan, wedge, or cone shaped radiation beam that traverses the examination region 106. A radiation sensitive detector array 112 detects radiation that traverses the examination region 106 and generates projection data indicative of the detected radiation.

A reconstructor 114 reconstructs the projection data and generates volumetric image data indicative of the examination region 106. A general purpose computing system serves as an operator console 116, and includes an output device such as a display and an input device such as a keyboard, mouse, and/or the like. Software resident on the console 116 allows the operator to control the operation of the system 100, for example, allowing the operator to initiate scanning, etc.

A computing system 118 such as a workstation, a computer, or the like facilitates evaluating the projection and/or image data. The computing system 118 includes one or more processors 120 and computer readable storage medium 122 (e.g., physical memory) encoded or embedded with computer readable instructions, which, when executed by the one or more processors 120 cause the system 118 to carry out various functions. The storage medium 122 includes application memory 124 for storing software applications and data memory 126 for storing data.

In the illustrated embodiment, the application memory 124 at least stores an image artifact identification application 128. As described in greater detail below, the image artifact identification application 128, when executed by the one or more processors 120, provides an interactive graphical user interface (GUI) or viewer (e.g., via an applet or the like) including a database of sample images with known artifacts and information about the artifacts, including information relating to the cause of the artifacts and/or instructions for mitigating the artifacts.

Such a viewer can be employed in connection with viewing projection and/or image data corresponding to a patient, such as projection and/or image data from the system 100 and/or other imaging system. The viewer can also be employed pre-scanning, for example, to obtain information about scanning a patient to avoid and/or prevent artifacts in the resulting projection and/or image data. The viewer can also be employed without regard to a particular patient, for example, for training purpose, for example, to train a clinician to recognize certain artifacts in projection and/or image data.

As an example of the former, the image artifact identification application 128 can be automatically or manually invoked, where the executing application 128 opens a viewing window and provides sample images therein that can be scrolled through and visually compared with the projection and/or image data. The comparison can be used to facilitate identifying sample images that include the artifacts visually present in the projection and/or image data.

Once such sample images are identified, the information related to processing the projection and/or image data to reduce or remove the artifact in the current data and/or performing the imaging procedure in a manner to mitigate the artifact can be reviewed. The user can employ the viewer to scroll through the sample images, for example, one by one or many by many. Such scrolling can be achieved manually by a user or automatically based on configuration settings that determine the delay between sample images, etc.

Where the information recommends processing the projection and/or image data, the image artifact identification application 128 can be used to automatically or manually (via user interaction) initiate such processing. Where the processed data is to be reconstructed, the image artifact identification application 128 can employ the reconstructor 114 and/or a reconstruction processing algorithm from the storage 122.

When a known artifact absent from the sample image available to the image artifact identification application 128 is located in projection and/or image data, the image artifact identification application 128 allows the operator to add the projection and/or image data as a sample image and, optionally, include textual information along with the projection and/or image data.

When an artifact cannot be identified based on the sample images with known artifacts 204, the image artifact identification application 128 can be used convey the projection and/or image data to another system for further evaluation in an attempt to figure out a cause of the artifact and mitigating action. The other system may be a dedicated common source of the sample images and/or other scanner, imaging facility, etc.

Of course, the image artifact identification application 128 does not have to be utilized to process the projection and/or image data, to initiate reconstruction of processed projection and/or image data, to add new sample data, or convey the projection and/or image data to the other system.

Additionally or alternatively, the sample images can be provided through a physical picture album, book, binder, or the like, along with textual guidance like "Here are two example artifacts. If the artifact in the current acquisition is similar to the left example, please continue on page 20. If the artifact in the current acquisition is similar to the right example, please continue on page 30."

The database of sample images can be variously updated. For example, in one instance, the database is automatically updated when a new sample image and/or a change in an existing sample image becomes available. In another instance, the database is updated on-demand and/or based on a predetermined update schedule. Such updates can be achieved over a network through a remote service for the computer-based implementation or the distribution of additional pages for a non-computer-based implementation.

One or more communications ports 130 are configured for communication with one or more input devices (e.g., a keyboard, a mouse, and the like), one or more output devices (e.g., a display, a printer, etc.), one or more apparatuses (e.g., a computing system, portable storage, etc.), one or more data repositories, the system 100 (e.g., the console 116 and/or the reconstructor 114), etc. A graphics controller 132 processes data for presentation on a monitor such as display in a human readable format.

Although the storage medium 122 is showed as a single component, it is to be understood that the storage medium 122 may include a plurality of storage units, including storage local to the computing system 118 and/or storage external from the computing system 118. Additionally or alternatively, the one or more processors 120 execute instructions carried by transitory medium such as a signal or wave carrier. Moreover, the computing system 118 may be part of the console 116, or vice versa, or located remote from the system 100.

Figure 2:
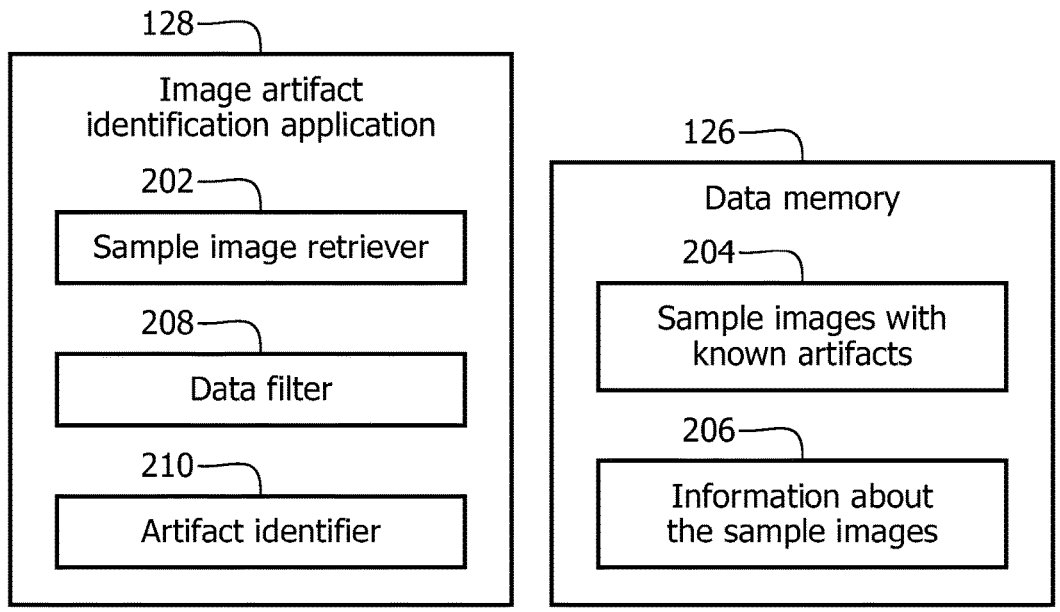
FIG. 2 shows an example image artifact identification application.

FIG. 2 illustrates an example of the image artifact identification application 128 and data in the data memory 126 utilized thereby.

In this example, a sample image retriever 202 retrieves sample images with known artifacts 204 from a sample image data repository such as a remote database, server, or the like over a network connection, from a CD, DVD or other portable storage, etc. The sample image retriever 202 can be invoked to retrieve such data upon executing the image artifact identification application 128, on demand, when an update is available, etc. The retrieved sample images with known artifacts 204 can be stored in the data memory 126 and/or elsewhere.

Information about the sample images 206 can be obtained in a similar manner and may be included with and/or conveyed along with the sample images with known artifacts 204. Such information may include textual, graphical, audible, etc. information about the sample images such as information related to processing the projection and/or image data to reduce or remove the artifact and/or to performing the imaging procedure in the future in a manner to mitigate the artifact.

By way of example, a sample image showing streak artifact caused by moving pockets of gas may be accompanied by text indicating that such artifact can be mitigated in the future by imaging the subject with a scan of shorter duration. The text may also indicate that the clinician should also consider having the patient ingest medication to reduce bowel activity during the scan. For an artifact caused by metal objects in or around the patient, the system may suggest running a software-based metal artifact correction step and re-reconstructing the data, and may additionally remind the physician of the importance of removing metal objects form the scanner field-of-view in future studies, where possible.

For an artifact caused by an improper or no longer valid calibration, the information may indicate running a required calibration and then re-reconstructing the projection data. For an artifact caused by a non-favorable scan setup, the information may suggest repeating or performing the scan again with a different scan setup. In another example, the information may suggest employing a different set of operating conditions. The above examples are not limiting, and other suggestions are also contemplated herein.

A data filter 208 can be used to filter the sample images 206 being retrieved and/or displayed. The data filter 208 can employ various information for filtering such as information indicating the scanned body part (e.g., head, chest, heart, etc.), patient size, patient sex, the imaging protocol used, whether contrast was used, etc. Thus, where the anatomy of interest is the chest, sample images of the foot can be filtered out, or not retrieved or displayed. The data filter 208 may also facilitate assigning a relevance score to the retrieved sample images based on the filtering information and sorting the retrieved sample images based on the relevance score and/or otherwise.

The filtering information can be obtained from and/or conveyed with the projection and/or image data, and/or provided by the user. The filtering information may optimize the order of and/or reduce the volume of sample images through which a user might scroll through when attempting to identify an artifact and thus decrease the amount of time to identify the artifact and obtain mitigating information. In another embodiment, the data filter 208 is omitted.

An artifact identifier 210 evaluates the projection and/or image data in view of the sample images with known artifacts 204, identifies one or more samples images from the sample images with known artifacts 204 likely showing the artifact, being in the volumetric image data, and automatically retrieves the identified one or more sample images from the sample images with known artifacts 204 for presentation with the projection and/or image data. In another embodiment, the artifact identifier 210 is omitted.

In the illustrated embodiment, the sample image retriever 202, the sample images with known artifacts 204, the information about the sample images 206, the data filter 208 and the artifact identifier 210 are included in the storage medium 122. However, it is to be appreciated that one or more of 202-210 can be located in other local storage medium and/or external storage medium, including on a single storage medium or distributed across multiple storage mediums.

Figure 3:
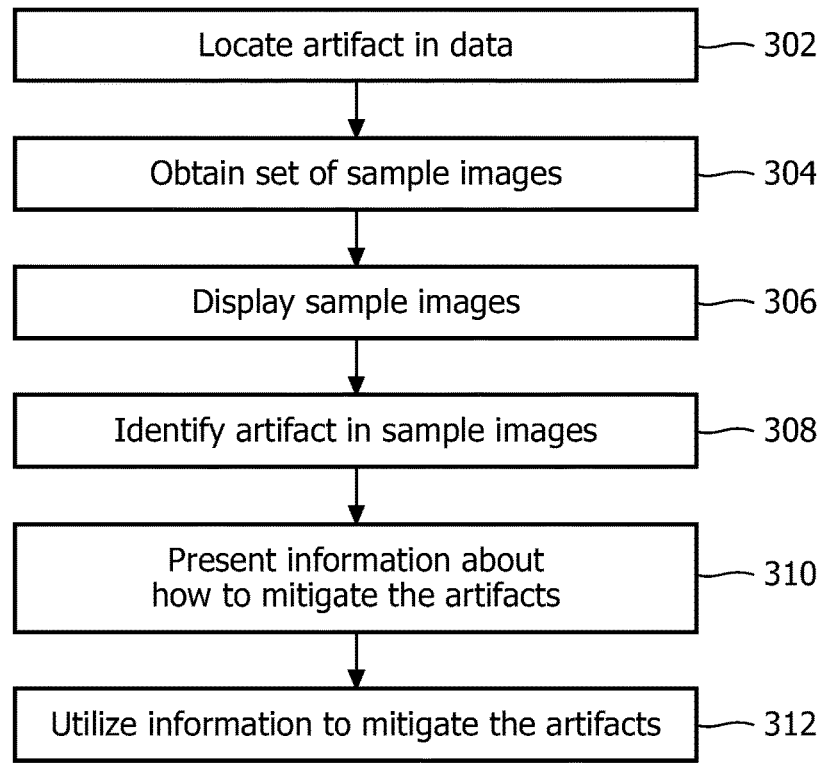
FIG. 3 illustrates a method for identifying and mitigating image artifacts.

FIG. 3 illustrates an example method. It is to be appreciated that the ordering of the acts in the methods described herein is not limiting. As such, other orderings are contemplated herein. In addition, one or more acts may be omitted and/or one or more additional acts may be included.

At 302, one or more image artifacts are located in displayed projection and/or image data. Automated, semi-automated and/or manual techniques can be employed.

At 304, a set of sample images with known artifacts and relevant to the particular imaging examination is obtained along with information about how to mitigate the artifacts.

At 306, the set of sample images is provided for display in an interactive graphical viewing window or viewer, individually or in combination.

At 308, the set of sample artifact images is utilized to identify the one or more artifacts.

At 310, the information about how to mitigate the identified artifacts is presented.

At 312, the information is utilized to remove or reduce the identified artifacts in displayed projection or image data and/or mitigate the artifacts from occurring in connection with subsequent imaging examinations.

The above may be implemented by way of computer readable instructions, which when executed by a computer processor(s), cause the processor(s) to carry out the described acts. In such a case, the instructions are stored in a computer readable storage medium associated with or otherwise accessible to the relevant computer. The acts need not be performed concurrently with data acquisition.

In the above method, artifact is first found in the displayed projection and/or image data. However, as briefly described herein, the image artifact identification application 128 can also be used prior to performing a scan. In this case, the clinician provides one or more keywords and initiates a search query, or the clinician pages through the catalog of artifacts, to obtain information to avoid issues and/or prevent artifacts before scanning the patient and exposing the patient to radiation.

The information searched and/or the information in the catalog can be filtered via the filter 208 or otherwise based on the anatomy selected for the scan, scan type, scan parameters, patient details (e.g. low mAs settings for a large patient), and/or other data. The artifact identifier 210 can also be used facilitate obtaining such information related to the particular scan.

The artifact identifier 210 can also be used "in retrospect" on a collection of acquisitions. This allows a user or service engineer to find image data where an artifact of interest that is described in the sample collection is present in acquisitions.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A method for identifying and mitigating artifacts in projection data or reconstructed image data, comprising:
   generating at least one of projection data or reconstructed image data by a scanning device;
   displaying the at least one of projection data or reconstructed image data having visually observable artifacts generated by a scanning device, wherein the at least one of the projection data or the reconstructed image data corresponds to an imaging examination of an object or subject;
   identifying one or more sample images other than of the object or subject with known artifacts having artifacts similar to the visually observable artifacts in the at least one of the projection data or the reconstructed image data;
   obtaining data from at least one of the projection or reconstructed image data indicative of a characteristic of the at least one of the projection or reconstructed image data;
   filtering the identified one or more sample images other than of the object or subject with known artifacts having artifacts similar to the visually observable artifacts in the at least one of the projection data or the reconstructed image data to correspond to the data thereby identifying a subset of one or more sampled images;

displaying, concurrently with the at least one of the projection data or the reconstructed image data having visually observable artifacts, the subset of the one or more sample images other than of the object or subject with known artifacts filtered to correspond to the data, and information related to mitigating the visually observable artifacts; and wherein the displaying, the identifying, the obtaining, the filtering, and the displaying concurrently are performed by a configured processor.

2. The method of claim 1, wherein the scanning device uses at least one of computed tomography (CT), Positron-Emission Tomography (PET), Single-Photon-Emission Tomography (SPECT), or Magnetic Resonance Imaging (MRI) modalities.

3. The method of claim 1, wherein the information includes information related to removing or reducing the visually observable artifacts from the at least one of the projection data or the reconstructed image data.

4. The method of claim 1, wherein the information includes information related to mitigating an occurrence of the visually observable artifacts in projection data or reconstructed image data in connection with a subsequently performed imaging examination.

5. The method of claim 1, wherein the sample images are displayed in at least one of an interactive graphical viewer.

6. The method of claim 5, wherein the interactive graphical viewer allows for scrolling through the sample images.

7. The method of claim 1, wherein the subset is filtered to correspond to the data by at least one of scanned body part, patient size, patient sex, imaging protocol, or presence of a contrast.

8. The method of claim 1, wherein the data corresponds to anatomy represented in the at least one of the projection or reconstructed image data.

9. The method of claim 1, further comprising:
determining relevance scores for the sample images in the subset; and
sorting a display order of the sample images in the subset based on the relevance scores.

10. The method of claim 1, wherein the information includes at least one of textual, graphical or audible information.

11. The method of claim 1, wherein the information recommends processing the projection data and reconstructing the processed projection data to generate second reconstructed image data.

12. The method of claim 1, wherein the information recommends repeating the imaging examination under a different set of operating conditions.

13. A computing system for identifying and mitigating artifacts in projection data or reconstructed image data, comprising:
a scanning device configured to generate the at least one of projection data or reconstructed image data;
computer readable storage medium, including:
non-transitory application memory encoded with instructions for an image artifact identification application; and
data memory encoded with the at least one of projection data or reconstructed image data utilized by the image artifact identification application and generated by the scanning device; and one or more processors configured to execute the instructions for the image artifact identification application, wherein the executing instructions:
identify one or more sample images other than of an object or subject with known artifacts having artifacts similar to visually observable artifacts in the at least one of the projection data or the reconstructed image data,
obtain data from the at least one of the projection or reconstructed image data indicative of a characteristic of the at least one of the projection or reconstructed image data;
filter the identified one or more sample images which identifies only a subset of the one or more sample images with known artifacts that correspond to the data; and
display an interactive graphical viewer with only the subset of the one or more sample images with the known artifacts concurrently with at least one of projection or image data from an imaging examination of the object or subject filtered to correspond to the data and each filtered sample image includes information related to mitigating the known artifacts.

14. The system of claim 13, further including: the scanning device configured to generate the at least one of projection data or reconstructed image data using at least one of computed tomography (CT), Positron-Emission Tomography (PET), Single-Photon-Emission Tomography (SPECT), or Magnetic Resonance Imaging (MRI) modalities.

15. The system of claim 13, wherein the information includes information related to removing or reducing a visually observable artifact from the at least one of the projection data or the reconstructed image data using previously acquired image data.

16. The system of claim 13, wherein the information includes information related to mitigating an occurrence of a visually observable artifacts in projection data or reconstructed image data in a subsequently performed imaging examination.

17. The system of claim 13, wherein the interactive graphical viewer allows for scrolling through the sample images.

18. The system of claim 13, wherein the information includes audible information.

19. The system of claim 13, wherein the sample images are evaluated before the imaging examination and used to obtain information related to avoiding artifacts with the imaging examination.

20. The system of claim 19, wherein the information is obtained through at least one of a key word search of the sample images based on anatomy to be scanned or scrolling through a set of sample images corresponding to the anatomy to be scanned.

21. The system of claim 13, wherein the sample images are utilized independent of the imaging examination to train a clinician to recognize certain artifacts in projection and/or image data.

22. The system of claim 13, wherein the interactive graphical viewer allows for adding new sample images with known artifact for subsequent evaluation.

23. The system of claim 13, wherein the information includes a recommended processing step to remove an artifact from the at least one of the projection data or the reconstructed image data, and the system automatically performs the recommended processing step.

24. A non-transitory computing readable storage medium encoded with computer readable instructions for identifying and mitigating artifacts in projection data or reconstructed image data, which, when executed by one or more processors of a computing system, cause the computer system to: identify sample images with known artifacts having artifacts similar to visually observable artifacts in at least one of projection data or reconstructed image data from an imaging examination generated using at least one of a computed tomography (CT), a Positron-Emission Tomography (PET), a Single-Photon-Emission Tomography (SPECT), or a Magnetic Resonance Imaging (MRI) modality, obtain data from the at least one of the projection or reconstructed image data indicative of a characteristic of the at least one of the projection or reconstructed image data, filter the identified sample images with known artifacts having artifacts similar to the visually observable artifacts in the at least one of projection data or reconstructed image data, and display an interactive graphical viewer displaying only a subset of the identified sample images with known artifacts filtered to correspond to the data concurrently with the at least one of projection or image data, wherein each filtered sample image includes information related to mitigating a corresponding artifact and each filtered sample image is of an object or subject different from the imaging examination.

* * * * *